Oct. 14, 1941.　　　　L. GILL　　　　2,258,754
FRANGIBLE LICENSE PLATE FOR AUTOMOBILES AND THE LIKE
Filed Feb. 24, 1940
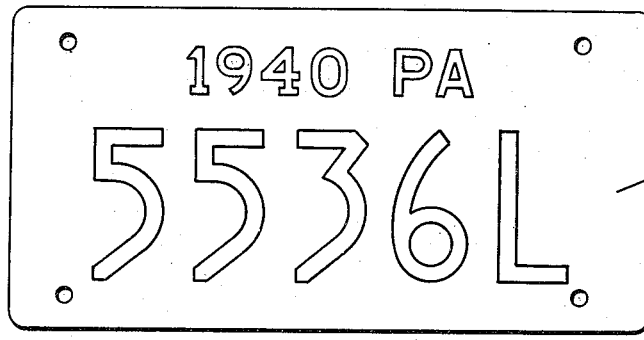
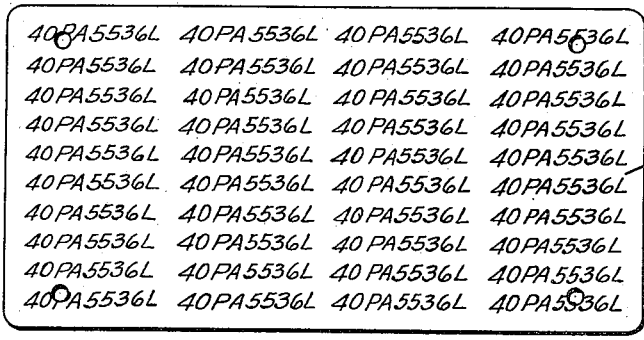
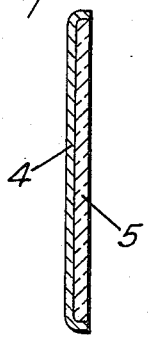
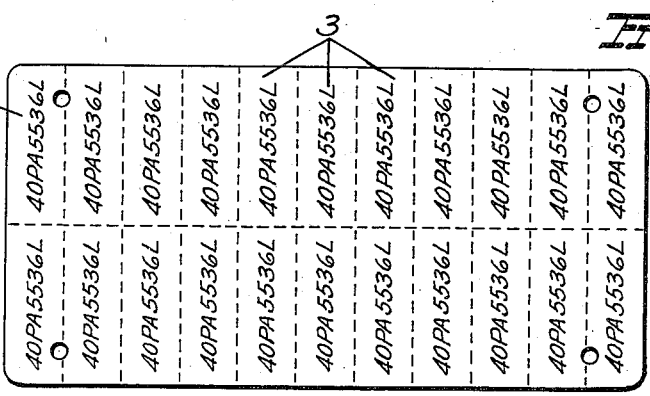
Leo Gill
　　Inventor
By　W.F.A. McEwan
　　Attorney Patented Oct. 14, 1941

2,258,754

UNITED STATES PATENT OFFICE 2,258,754

FRANGIBLE LICENSE PLATE FOR AUTOMOBILES AND THE LIKE

Leo Gill, Allentown, Pa., assignor of thirty per cent to David R. Diehl, Weissport, Pa.

Application February 24, 1940, Serial No. 320,552

4 Claims. (Cl. 116—32)

My invention relates to license plates commonly required to be carried in well known manner by automobiles and like vehicles using the public highways, such plates bearing a license-indicating indicia or legend by which the owner of the vehicle, year of license, and state using the same, may be readily determined by the proper authorities.

My object is to curb reckless drivers, and insure more careful and considerate operation of automobiles, by providing them with license plates of a frangible nature, bearing multiple license identifying indicia, one thereof conforming to regulation size and arrangement, so that in the event of an accident of sufficient shock to break the plate, such broken plate will at once call attention to the automobile, and scattered fragments at the place of the accident will give tell-tale evidence by means of which a hit-and-run driver may be discovered and apprehended.

With the above object in view, and with other objects and advantages that will later herein appear, my invention comprises an improved frangible license plate more fully described in the following specification and in connection with the accompanying drawing, the novel features thereof being set forth in the appended claims.

Fig. 1 is a front-face view of a license plate embodying my invention and indicating a regulation form of license-identifying indicia.

Fig. 2 is a rear-face view indicating one arrangement of the reduced size multiplied indicia employed to reveal on broken fragments full license-identifying information.

Fig. 3 is a similar rear face view of the plate, but indicating a different arrangement of the multiplied indicia.

Fig. 4 is a vertical sectional view of a modified form of the plate having a non-frangible front-face portion, and a frangible rear-face portion.

The nature and use of license plates is well known, and as heretofore made of metal, they withstood severe accident shocks without breaking or leaving behind tell-tale evidence, so as to encourage inconsiderate drivers to run away.

Having the object of inducing safer operation of cars, and providing for ready detection of hit-and-run drivers, my improved license plate is made of frangible material, preferably of any suitable known commercial plastic, capable of, or processed, to withstand ordinary shocks of safe operation of the automobile, but shatterable when subjected to shocks in excess thereof.

Referring to the drawing, 1 represents the front-face of a license plate made in accordance with my invention, and 2 the rear face thereof, such plate conforming in size and outline to specified requirements, and bearing on the front face 1 thereof, in prominent display, indicia in the usual form of numbers and letters informative of the particular license registration, year of registration, and State issuing the same, so the automobile and its owner may be readily identified at all times. This plate, according to my invention, is intended to be shattered by the shock of an accident, destroying the information indicia on the front face 1 thereof; and to prevent such loss, I provide the plate with a multiplication of additional indicia, of a smaller size than the indicia on the front-face thereof, but fully informative of the data contained in the latter. Such multiplication of additional indicia is preferably placed on the rear face 2 of the plate, and as shown is condensed in form and preferably arranged, as seen in Fig. 2, in repeated rows of multiple units, each of which carries data fully informative of the license indicia of the front face 1 of the plate. Thus constructed, any separate fragment of the broken plate will reveal full information as to the particular automobile and owner thereof.

It may be desirable in some cases to provide for a more assured and regulated breakage of the plate by providing lines of weakness therein, and in Fig. 3, I have indicated lines of weakness defining rectangular sections 3, each bearing at least one indicia of condensed form giving the full information of the enlarged indicia appearing on the front face 1 of the plate.

In Fig. 4 I have shown a composite structure of the license plate, in which the front-face portion 4 is made of non-frangible material, and the rear face portion 5 thereof alone made of frangible material. The front face portion 4 will bear the usual license indicia, and the rear portion 5 thereof multiplication in reduced and preferably condensed form of data, any broken fragment of which will reveal the plate from which it is broken away, and the ready identification of the automobile and owner thereof.

It is not essential that the multiplication of reduced size indicia be arranged in any particular order, as they may be scattered indiscriminately over the rear face 2, appear on the front face 1 in a manner not to interfere with clear reading of the enlarged display thereon, or be placed on both faces 1 and 2, as found desirable.

Knowing that his license plates are frangible, that a broken plate will indicate an accident, and that any broken away particle will carry identifying evidence, a reckless operator will exert more caution, both in driving and parking, thus helping to materially reduce accidents.

The essential of my improved license plate is that it shall be brittle and shatterable, any suitable material of such nature being acceptable, but I prefer to use a plastic, as Bakelite, or one of its less expensive substitutes or equivalents, as such material lends itself to economy of production and beauty of appearance. Such material may be made of suitable colors for the background, leaving only the indicia to be separately colored; its smooth surface will not be clouded by dust adherence; and its legibility is free from destruction by rust.

Plates made of such plastic material may be readily cut from sheets, or die-formed as units, and the indicia printed thereon in suitable color, or in a softened state, the indicia may be readily pressed or embossed thereon. The general data for the multiplied reduced-size indicia is constantly repeated, leaving only the change of license numbers to be provided for. And such change may be effected by usual number-changing printing presses, or by roller or reciprocative die holders having changeable units, progressively wheeled or relatively progressed over the face of the plate to be marked.

Having now fully described my invention and its manifest advantages and effective accomplishment of my objects, it is evident changes and modifications of the same may be made within the scope of my invention as defined in the following claims.

What I claim is:

1. An opaque shatterable license plate for automobiles and like vehicles bearing similar license identifying indicia on both its front and rear faces, the front face having a single display showing of said indicia of large regulation size, and the rear face having a repetitious multitudinous array of greatly reduced size reproductions of said indicia, so that shattered fragments of the broken plate will bear one or more of said reduced size reproductions of said identifying indicia.

2. An opaque shatterable license plate for automobiles and like vehicles bearing similar license identifying indicia on both its front and rear faces, the front face having a single display showing of said indicia of large regulation size, and the rear face having greatly reduced size multireproductions of said indicia showing thereon in closely spaced ordered arrangement, so that shattered fragments of the broken plate will bear one or more of said reduced size reproductions of said identifying indicia.

3. An opaque shatterable license plate for automobiles and like vehicles bearing similar license identifying indicia on both its front and rear faces, the front face having a single display showing of said indicia of large regulation size, the rear face having greatly reduced size multireproductions of said indicia showing thereon in closely spaced ordered arrangement, and vertical and horizontal lines of weakness defining sections of said reduced size indicia reproductions, so that shattered fragments of the broken plate will include a section bearing a reduced size reproduction of the identifying indicia.

4. A regulation size auto license plate having a shatterable body, complete regulation identifying indicia on the front surface of said body, identifying indicia on a surface rearward of the front surface, the indicia on said rearward surface being of reduced size and appearing in multiple, the structure of said license plate being weakened by spaced grooves to define a plurality of areas each bearing said reduced indicia.

LEO GILL.